United States Patent
Arnold

[11] 3,944,263
[45] Mar. 16, 1976

[54] DYNAMIC PIPE COUPLING

[75] Inventor: James F. Arnold, Houston, Tex.

[73] Assignee: HydroTech International, Inc., Houston, Tex.

[22] Filed: Mar. 14, 1975

[21] Appl. No.: 558,428

[52] U.S. Cl. .................. 285/96; 285/106; 285/261; 285/308; 285/321; 285/351
[51] Int. Cl.² ......................................... F16L 17/00
[58] Field of Search 285/18, 96, 106, 261, DIG. 21, 285/308, 321, 263, 270, 166, 167, 262, 264, 265, 266, 267, 268, 269, 271, 351, 315, 316, 317; 166/.6

[56] References Cited
UNITED STATES PATENTS

| | | | |
|---|---|---|---|
| 3,433,504 | 3/1969 | Hanes | 285/321 X |
| 3,450,421 | 6/1969 | Harwell | 285/321 X |
| 3,695,633 | 10/1972 | Hanes | 285/DIG. 21 |
| 3,712,645 | 1/1973 | Herter | 285/167 |

FOREIGN PATENTS OR APPLICATIONS

| | | | |
|---|---|---|---|
| 115,767 | 9/1925 | Switzerland | 285/264 |
| 872,903 | 4/1953 | Germany | 285/270 |

*Primary Examiner*—Dave W. Arola

[57] ABSTRACT

A dynamic pipe coupling for connecting the ends of two pipes so as to prevent axial separation thereof but which permits axial flexing therebetween. The coupling includes two coupling members, each of which is connectible at one end thereof to the end of one of the pipes. One member has attached thereto a ball-shaped portion and the other coupling member has a housing arranged to receive the ball portion thereinto. Further, the housing has an annular channel-shaped groove thereabout facing radially outwardly. The coupling includes a setting ring assembly mountable about the coupling members, with the ring having a portion with an internal surface for matingly engaging the rearward side of the ball and having another portion for receiving thereinto and radially surrounding at least that portion of the external surface of the other coupling member having the aforesaid annular recess. The ring carries generally radially movable wedges arranged for engaging in the groove upon actuation to thereby urge and hold the coupling members axially together. Means in the form of a hydraulically actuated radially movable annular seal is provided for urging the wedges radially inwardly into engagement with the aforesaid annular recess to thereby lock the tool together. Seals operated by line pressure are also arranged for sealing between the ball and the housing. In addition, other seals are provided for sealing between the ball and the ring and between the ring and the housing.

8 Claims, 3 Drawing Figures

DYNAMIC PIPE COUPLING

BACKGROUND OF THE INVENTION a. Field of the Invention

This invention relates to that class of pipe couplings sometimes referred to as ball and socket couplings or dynamic couplings. More particularly, this invention relates to a ball and socket type coupling which is arranged for connecting the ends of two pipes, which connection will permit axial flexing between the two pipes but which retains the pipes together and prevents axial separation thereof. The coupling of this invention can withstand repeated flexing and can withstand substantial line pressure without malfunction or failure.

b. Description of the Prior Art

There are many examples of prior art ball type couplings. However, most of these are the type which are manually set which, therefore, are not very useful in effecting a coupling in an underwater location, for example. Other ball and socket couplings are adapted for relatively low line pressure and are not successful in installations where high pressure petroleum products may be flowed therethrough, as for example, natural gas or the like. As a consequence, there has developed a need for a ball and socket type coupling which can withstand repeated flexing as, for example, the wave action in a subsea location, and which can transmit high pressure fluids without early failure and which coupling members can be joined remotely, if desired or required.

SUMMARY OF THE INVENTION

It is, therefore, an object of this invention to provide an improved dynamic pipe coupling for connecting the ends of two pipes, which coupling can withstand high pressure fluids transmitted therethrough, which can withstand repeated flexing movement, as, for example, that which is caused by wave action, without premature failure, and which can be actuated remotely as, for example, by hydraulic fluid to thereby complete a remote connection, if desired.

Briefly stated, this invention is for a dynamic pipe coupling for connecting the ends of two pipes, which pipe ends may be axially misaligned. It includes a pair of coupling members, each of which is connectible at one end thereof to the end of one of the pipes. One of the coupling members has attached thereto an annular enlarged portion having spherical-shaped axially forward and rearward sides. The other coupling member has attached thereto a housing having a portion with an internal surface for receiving the forward side of the enlarged portion in mating engagement therewith. The housing also has a portion forming a generally annular external shoulder spaced generally radially outward from the aforesaid internal surface. A setting ring assembly is provided which is mountable about the coupling members, with the ring having a portion with an internal surface for matingly engaging the rearward side of the enlarged portion and having another portion for receiving thereinto and radially surrounding at least that portion of the external surface of the other coupling member having the shoulder. The ring carries generally radially movable wedge means for engaging the shoulder upon actuation thereof, for urging and holding the coupling members axially together. Means are also provided for urging the wedge means generally radially inward into engagement with the shoulder, whereby the coupling members hold the pipes against axial separation while permitting axial flexing therebetween.

Preferably, the coupling includes annular seal means interposed between the forward side of the enlarged portion and the internal surface of the housing for effecting a fluid seal therebetween. In certain embodiments, means for applying pressure thereto to urge said seals to the sealing position are provided.

The shoulder is preferably in the form of an annular recess extending about the housing and the wedge means are in the form of at least one arcuate-shaped wedge which is arranged for engagement with the recess. The coupling may also include seal means between the setting ring and the rearward side of the enlarged portion and between the setting ring and the housing for effecting fluid seals therebetween.

DESCRIPTION OF THE PREFERRED EMBODIMENT

Figure 1:
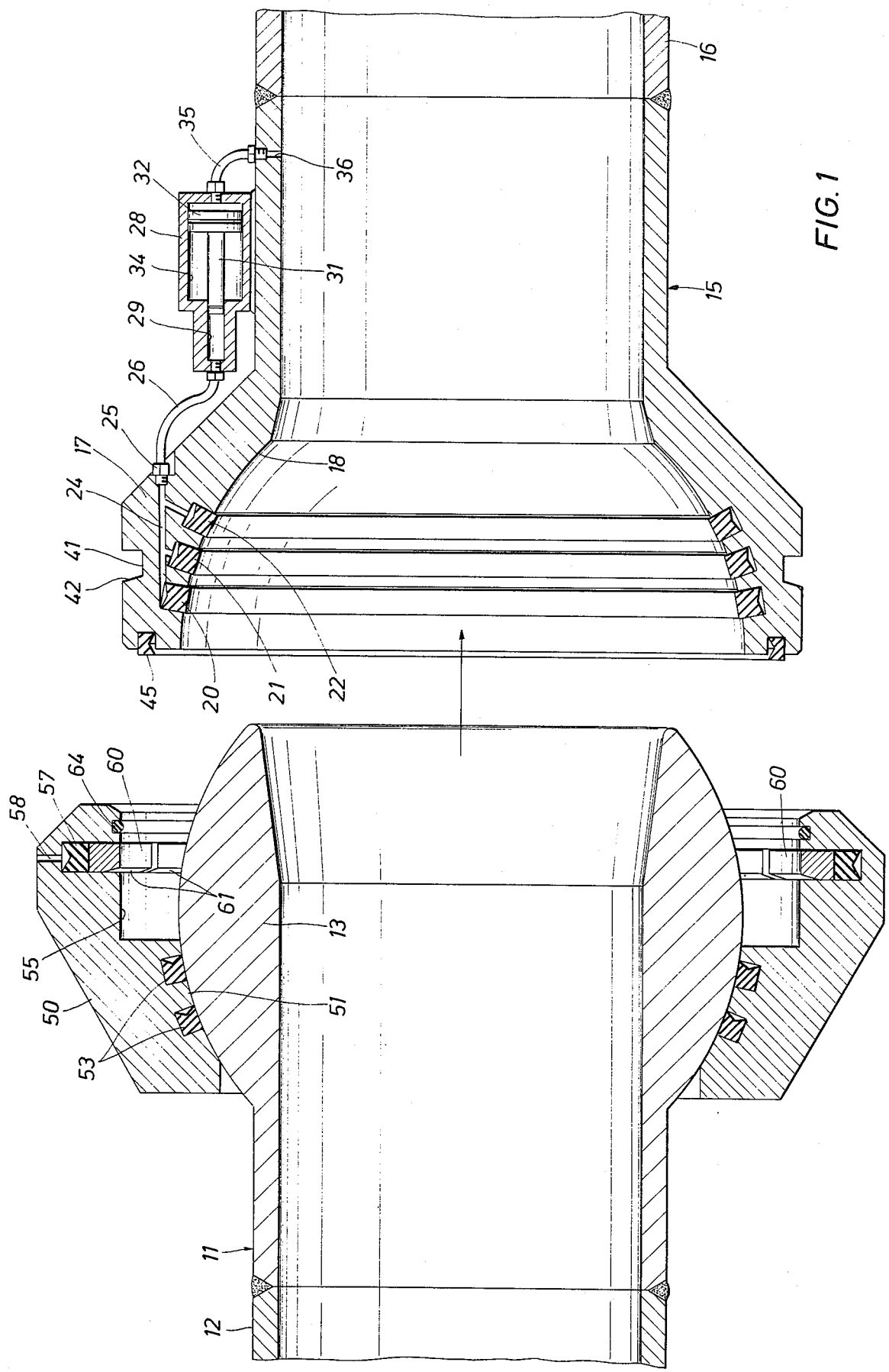
FIG. 1 is a generally central longitudinal sectional view showing one embodiment of the invention wherein the coupling members are axially spaced apart immediately prior to being moved to the connecting position.

Referring now to the drawings, coupling member 11 is shown attached as by welding or the like to pipe 12. It is to be understood that such a welded connection to pipe 12 would normally be performed in a convenient welding environment. However, in those instances when that is not possible, then coupling 11 may be connected to a sub which, in turn, is connected to a hydraulic coupling which in turn connects the coupling member 11 to pipe 12 when a coupling operation is to be entirely performed underwater. Coupling member 11 is provided with a radially outwardly enlarged portion 13 having a spherical-shaped configuration on both the axially rearward and forward sides thereof. This enlarged portion may sometimes, for convenience, be referred to as a ball or ball portion.

The other coupling member of this dynamic pipe coupling is designated by the numeral 15 and is shown attached to pipe 16 as by welding or the like. As with coupling member 11, in the event it is not convenient to weld coupling member 15 to pipe 16 in a convenient welding environment, coupling member 15 may alternatively be attached to a sub which, in turn, is arranged for connection to a pipe 16 by use of an overfitting hydraulic coupling or the like, as is well known to those skilled in the art. Further, it should be understood that while coupling members 11 and 15 are shown in axial alignment, these coupling members are particularly adapted for connecting pipes which are not in axial alignment but, in fact, may be misaligned a substantial extent.

Coupling member 15 also includes a portion designated as socket housing 17 which has a radially enlarged axial forward bore forming spherical-shaped seat 18 which is arranged for mating engagement with the forward side of enlarged portion 13. Seat 18 is provided with seal means in the form of three axially spaced generally radially inward facing channel-shaped recesses in which are received annular elastomeric seals 20, 21 and 22. Seals 20–22 each form radially outwardly thereof an enclosed chamber with the base of the recess in which each is received or mounted and which chambers are in fluid communication through conduit means, including port 24 having a threaded adapter 25 which, in turn, is attached to line 26.

Line 26, in turn, connects with the forward end of cylinder 28 mounted on the exterior surface of coupling member 15, as shown. The forward end of cylinder 28 is provided with a reduced piston chamber 29 in which is received piston rod 31 arranged for axial movement therein. The other end of rod 31 has attached thereto an enlarged piston 32 which is arranged for axial movement in the enlarged bore 34 of cylinder 28. The right end of cylinder 28 as shown in FIG. 1 connects to line 35 which, in turn, is tapped into the internal surface of coupling member 15 through port 36.

It will be noted that whatever fluid pressure is present within coupling member 15 will be transmitted through port 36, line 35 to cylinder 28, and act upon the right end of piston 32, as shown in FIG. 1. The left end of piston rod 31 is arranged to contact hydraulic fluid which is maintained in reduced chamber 29, line 26, and port 24. Hence, line pressure is thereby applied to generate hydraulic fluid pressure which, in turn, is applied to the radially outward side of seals 20, 21 and 22 to effect a seal between spherical seat 18 and the forward surface of enlarged portion 13. Because of the larger diameter of piston 32 relative to rod 31 and the miltiplier effect thereof, greater hydraulic pressure is supplied to the radially outward side of seals 20, 21 and 22 than the pressure which is present within coupling member 15, thereby insuring positive sealing between coupling members 11 and 15.

Housing 17 has a portion in which is formed a generally radially outwardly facing channel-shaped annular recess 41 having a slightly axially tapered forward shoulder 42, the purpose of which will be described hereinafter. In addition, the forward end of housing 17 is provided with a generally axially facing annular recess in which is mounted another elastomeric seal 45, which is arranged for effecting a fluid seal between housing 17 and setting ring 50, which will now be described.

Setting ring 50 is shown generally mounted radially about coupling member 11 in the initial position, as shown in FIG. 1. It is formed with an internal spherical-shaped seat 51 which matingly engages the rearward side of enlarged portion 13 as shown. Seat 51 has a pair of axially spaced apart generally radially inwardly facing annular recesses in each of which is mounted an elastomeric seal 53 for effecting sealing between seat 51 and enlarged portion 13.

Figure 2:
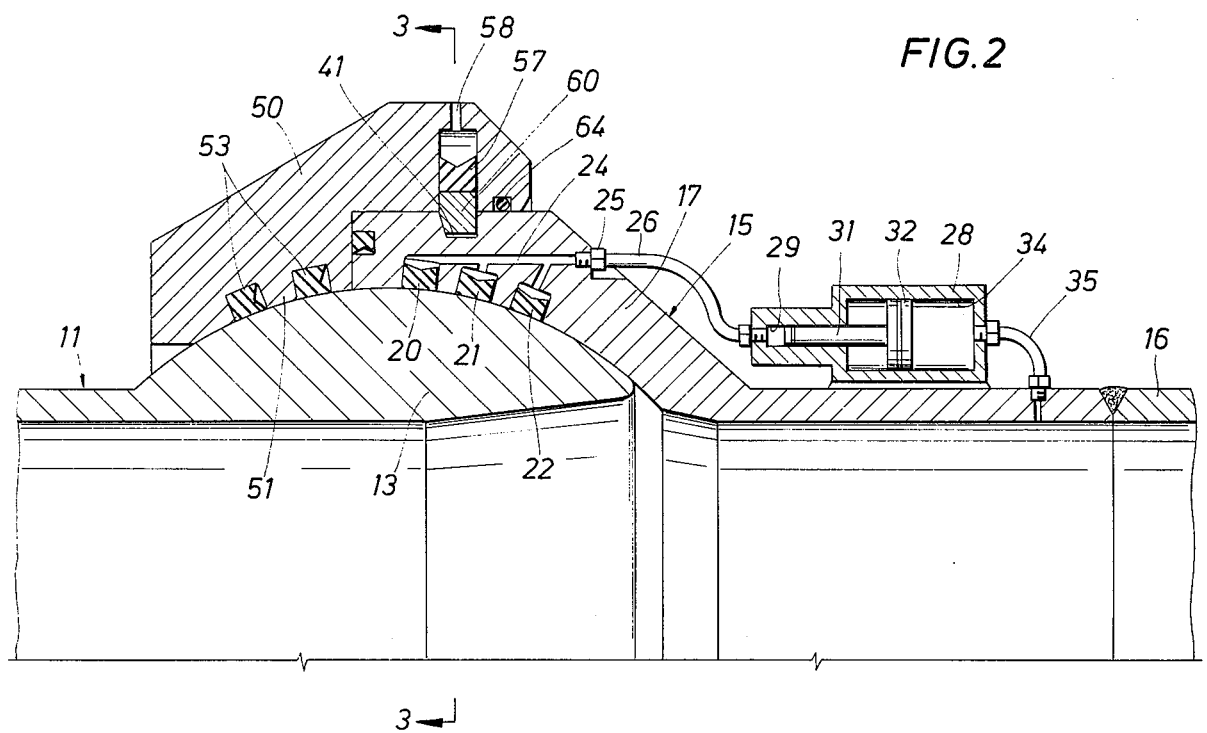
FIG. 2 is a fragmentary view on a somewhat reduced scale of the apparatus shown in FIG. 1, but showing the coupling members moved to the connected or engaged position.
Figure 3:
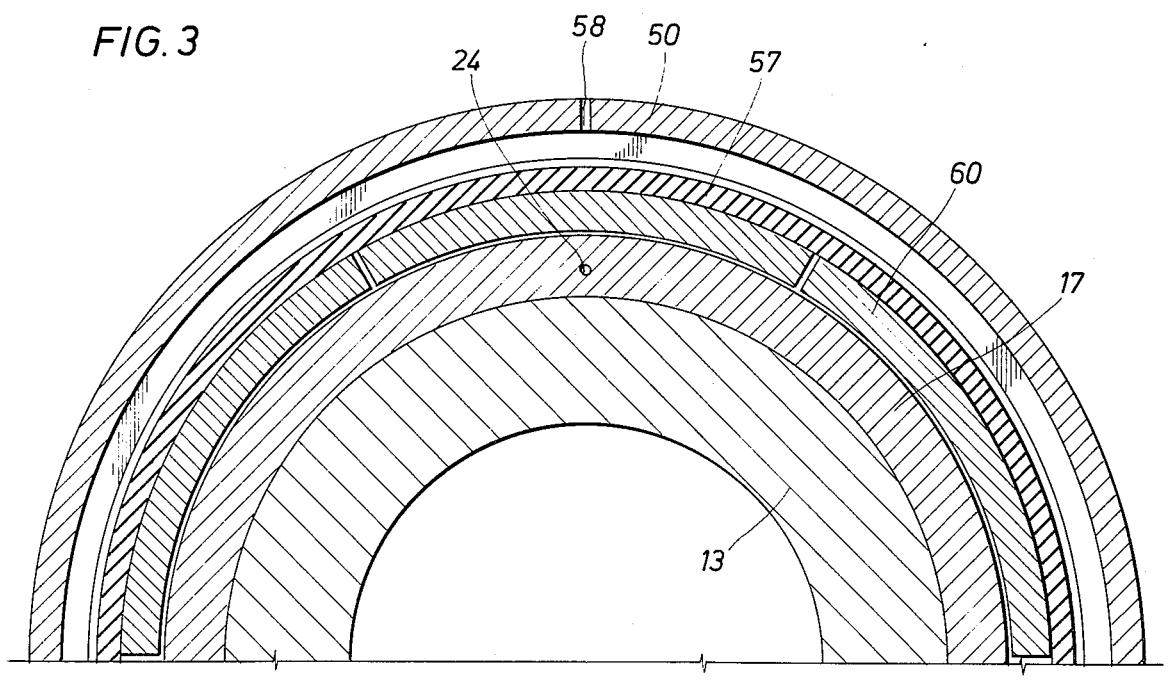
FIG. 3 is a cross-sectional view generally taken along line 3—3 of FIG. 2.

The axial forward side of setting ring 50 is provided with an enlarged annular bore 55 which is adapted for receiving thereinto the forward end of socket housing 17 as shown in FIG. 2. Setting ring 50 carries wedge means for wedgingly engaging the aforesaid forward shoulder 42 of housing 17 for locking the tool together and holding the same against axial separation. Setting ring 50 is also provided with a forward portion having an annular generally radially inwardly facing recess in which is mounted an annular elastomeric thrust seal 57 arranged for radially inward movement in response to the application of hydraulic fluid pressure through approximately valved port 58.

Seal 57 has attached thereto wedge means which will now be described. The wedge means in the preferred embodiment are in the form of a plurality of arcuate-shaped wedges 60 which are bonded or otherwise held by seal 57 in an initially radially retracted position, such that housing 17 is freely received in bore 55. Wedges 60 extend around substantially the full circumference of setting ring 50 and are arranged for engagement with forward shoulder 42 of housing 17, as shown in FIG. 2. Hence, wedges 60 are each provided with a tapered surface 61 which generally mate with forward shoulder 42.

When the tool is assembled as shown in FIG. 2 and hydraulic pressure is applied through port 58, thrust seal 57 is urged radially inwardly thereby urging wedges 60 radially inwardly into camming engagement in recess 41 of housing 17. Tapered shoulder 42 and tapered surfaces 61 engage and thereby axially urge coupling members 11 and 15 together and hold the same together, thereby preventing axial separation thereof. So held, coupling members 11 and 15 are held against axial separation but are still allowed to articulate relative to each other or, stated otherwise, to have flexing movement therebetween. While wedges 60 have been described as being preferably in the form of a plurality of separate members, it is to be understood that other wedge means can be used as, for example, a split ring which has somewhat enlarged circumferential dimensions such that it will remain retracted, but which can nevertheless be deformed radially inward by fluid pressure applied to the rearward side of thrust seal 57. The forward side of ring 50 is also provided with another annular recess axially forward of the wedges 60 and in which recess is mounted another elastomeric seal 64 which is arranged for sealing engagement between ring 50 and the external surface of housing 17 axially rearward of recess 41, as best shown in FIG. 2.

In operation, coupling members 11 and 15 are initially positioned in the manner shown in FIG. 1 and moved together in the direction of the arrow until the forward surface of enlarged portion 15 mates with spherical seat 18 of housing 17. So positioned, hydraulic pressure is then applied through port 58 to cause wedges 60 to enter annular recess 41 and engage tapered surface 42, thereby urging and holding coupling members 11 and 15 axially together. Thus assembled, it will be observed that seals 53 provide a fluid seal between the rearwardsurface of enlarged portion 13 and seat 51 of ring 50. In addition, seals 45 and 64 provide annular seals between ring 50 and housing 17 at axially spaced apart positions on opposite axial sides of wedges 60. Moreover, seals 20, 21 and 22 provide seals between seat 18 of housing 17 and the forward surface of enlarged portion 13, which sealing is enhanced upon passage of pressurized fluid through the coupling members, as described above. Because of the multiplier effect of the arrangement of piston 32 and rod 31, enhanced hydraulic pressure is applied to the radially outward sides of these seals 20, 21 and 22, to effect a very efficient primary seal for coupling members 11 and 15.

Because of the novel arrangement of the tool, couplings 11 and 15 will withstand tremendous line pressure without failing, will withstand axial separation while at the same time permitting axial flexing movement therebetween or, stated otherwise, permitting articulated movement therebetween, over long service periods without failure. Moreover, inasmuch as the wedging means in the form of wedges 60 are hydraulically actuated, the tool may be used for effecting pipe coupling operations remotely should that be required.

Further modifications and alternative embodiments of the apparatus and method of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiment. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. In a dynamic pipe coupling for connecting the ends of two pipes, the combination comprising:

a pair of coupling members, each of which is connectible at one end thereof to the end of one of said pipes;

one of said coupling members having attached thereto an annular enlarged portion having spherical-shaped axially forward and rearward sides;

the other coupling member having attached thereto a housing having a portion with an internal surface receiving the forward side of said enlarged portion in mating engagement therewith, said housing having a portion forming generally annular external shoulder means spaced generally radially outward from said internal surface;

a setting ring assembly mounted about said coupling members, said ring having a portion with an internal surface matingly engaging the rearward side of said enlarged portion, and having another portion receiving thereinto and radially surrounding at least that portion of the external surface of said other coupling member having said shoulder means;

said ring carrying generally radially movable wedge means for engaging said shoulder means upon actuation thereof and urging and holding said coupling members axially together;

and means for urging said wedge means generally radially inward into engagement with said shoulder means, whereby said coupling members hold said pipes against axial separation while permitting axial flexing therebetween.

2. The invention as claimed in claim 1 including:

annular seal means interposed between said forward side of said enlarged portion and said internal surface of said housing for effecting a fluid seal therebetween;

and means for applying line pressure from said pipes to urge said seal means to the sealing position.

3. The invention as claimed in claim 1 wherein:

said shoulder means is in the form of an annular recess extending about said housing.

4. The invention as claimed in claim 1 including:

seal means supported between said setting ring and said rearward side of said enlarged portion and between said setting ring and said housing, for effecting fluid seals therebetween.

5. The invention as claimed in claim 1 including:

seal means supported between said setting ring and said housing on each axial side of said wedge means for sealing between said ring and said housing.

6. The invention as claimed in claim 1 wherein:

said wedge means extend around substantially the full circumference of said housing.

7. The invention as claimed in claim 6 wherein:

said setting ring has a generally radially inwardly facing annular recess thereabout for supporting said wedge means;

and said wedge means includes at least one arcuate-shaped wedge member arranged for radial movement in said annular recess in said setting ring.

8. The invention as claimed in claim 7 wherein:

said wedge means extends substantially around the full circumference of said annular recess in said setting ring;

and said means for urging said wedge means includes an annular elastomeric seal mounted in said annular recess in said setting ring and positioned radially outward from said wedge means, and means for applying pressurized fluid to said recess to thereby urge said elastomeric seal radially inward, thereby moving said wedge means to the set position.

* * * * *